US012586576B2

(12) United States Patent　　　　　(10) Patent No.:　　US 12,586,576 B2
　　　Leitman　　　　　　　　　　　　　(45) Date of Patent:　　　Mar. 24, 2026

(54) SEMANTICALLY CONDITIONED VOICE ACTIVITY DETECTION

(71) Applicant: SoundHound AI IP, LLC, Santa Clara, CA (US)

(72) Inventor: Victor Leitman, San Jose, CA (US)

(73) Assignee: SoundHound AI IP, LLC, Santa Clara, CA (US)

( * ) Notice: Subject to any disclaimer, the term of this patent is extended or adjusted under 35 U.S.C. 154(b) by 314 days.

(21) Appl. No.: 18/047,650

(22) Filed: Oct. 19, 2022

(65) Prior Publication Data

US 2024/0135922 A1　　Apr. 25, 2024
US 2024/0233718 A9　　Jul. 11, 2024

(51) Int. Cl.
G10L 15/197　　　(2013.01)
G10L 15/18　　　(2013.01)
G10L 15/22　　　(2006.01)
G10L 25/78　　　(2013.01)

(52) U.S. Cl.
CPC ........ G10L 15/197 (2013.01); G10L 15/1815 (2013.01); G10L 15/22 (2013.01); G10L 25/78 (2013.01); *G10L 2015/223* (2013.01)

(58) Field of Classification Search
CPC ... G10L 15/197; G10L 15/1815; G10L 15/22; G10L 25/78; G10L 2015/223
See application file for complete search history.

(56) References Cited

U.S. PATENT DOCUMENTS 5,457,768 A　　10/1995　Tsuboi et al.
5,774,841 A　*　6/1998　Salazar ................... G10L 15/22
　　　　　　　　　　　　　　　704/E15.04

6,246,986 B1　　6/2001　Ammicht et al.
6,496,799 B1　　12/2002　Pickering
7,092,888 B1　　8/2006　McCarthy
7,379,867 B2　　5/2008　Chelba
7,440,895 B1　　10/2008　Miller
7,765,097 B1　　7/2010　Yu et al.

(Continued)

FOREIGN PATENT DOCUMENTS

CN　　1579059　　2/2005
EP　　2257034　　12/2010

(Continued)

OTHER PUBLICATIONS

Response to Office Action dated Aug. 12, 2024 in U.S. Appl. No. 18/206,567.

(Continued)

*Primary Examiner* — Mohammad K Islam

(74) *Attorney, Agent, or Firm* — Pearl Cohen Zedek Latzer Baratz LLP

(57)　　　　ABSTRACT

A method includes recognizing words comprised by a first utterance; interpreting the recognized words according to a grammar comprised by a domain; from the interpreting of the recognized words, determining a timeout period for the first utterance based on the domain of the first utterance; detecting end of voice activity in the first utterance; executing an instruction following an amount of time after detecting end of voice activity of the first utterance in response to the amount of time exceeding the timeout period, the executed instruction based at least in part on interpreting the recognized words.

8 Claims, 7 Drawing Sheets

(56) References Cited

U.S. PATENT DOCUMENTS

| | | | |
|---|---|---|---|
| 7,970,615 B2 | 6/2011 | Attwater et al. | |
| 8,843,369 B1 | 9/2014 | Sharifi | |
| 9,437,186 B1 | 9/2016 | Liu et al. | |
| 9,646,628 B1 | 5/2017 | Carlson et al. | |
| 9,843,861 B1* | 12/2017 | Termeulen | G10L 21/0208 |
| 10,096,328 B1* | 10/2018 | Markovich-Golan | G10L 21/0216 |
| 10,121,471 B2 | 11/2018 | Hoffmeister et al. | |
| 10,134,425 B1* | 11/2018 | Johnson, Jr. | G10L 25/87 |
| 10,224,030 B1 | 3/2019 | Kiss et al. | |
| 10,339,918 B2 | 7/2019 | Hofer et al. | |
| 10,510,340 B1 | 12/2019 | Fu et al. | |
| 10,832,005 B1 | 11/2020 | Mohajer et al. | |
| 10,854,192 B1* | 12/2020 | Maas | G10L 15/26 |
| 10,923,111 B1* | 2/2021 | Fan | G10L 15/16 |
| 10,943,606 B2 | 3/2021 | Doshi et al. | |
| 11,308,960 B2 | 4/2022 | Aguayo et al. | |
| 11,862,162 B2 | 1/2024 | Aguayo et al. | |
| 2003/0061042 A1 | 3/2003 | Garudadri | |
| 2003/0078928 A1 | 4/2003 | Dorosario et al. | |
| 2004/0193420 A1 | 9/2004 | Kennewick et al. | |
| 2005/0137939 A1 | 6/2005 | Calabria et al. | |
| 2005/0144064 A1 | 6/2005 | Calabria et al. | |
| 2005/0144065 A1 | 6/2005 | Calabria et al. | |
| 2005/0159945 A1* | 7/2005 | Otsuka | G01C 21/3608 704/226 |
| 2006/0200350 A1 | 9/2006 | Attwater et al. | |
| 2007/0288444 A1 | 12/2007 | Nelken et al. | |
| 2008/0071520 A1 | 3/2008 | Sanford | |
| 2008/0228496 A1 | 9/2008 | Yu et al. | |
| 2009/0064029 A1 | 3/2009 | Corkran et al. | |
| 2010/0124892 A1 | 5/2010 | Issa et al. | |
| 2011/0153318 A1 | 6/2011 | Rossello et al. | |
| 2011/0231185 A1* | 9/2011 | Kleffner | G10L 21/0272 704/226 |
| 2012/0046936 A1 | 2/2012 | Kandekar et al. | |
| 2012/0065960 A1 | 3/2012 | Iwama et al. | |
| 2012/0216178 A1 | 8/2012 | Gellerich et al. | |
| 2013/0055223 A1 | 2/2013 | Xu | |
| 2013/0060571 A1 | 3/2013 | Soemo et al. | |
| 2014/0039895 A1 | 2/2014 | Aravamudan et al. | |
| 2015/0112679 A1 | 4/2015 | Zhang | |
| 2016/0148615 A1 | 5/2016 | Lee et al. | |
| 2016/0379632 A1* | 12/2016 | Hoffmeister | G10L 25/87 704/253 |
| 2017/0069309 A1 | 3/2017 | Aleksic et al. | |
| 2017/0110118 A1 | 4/2017 | Tadpatrikar et al. | |
| 2017/0178623 A1 | 6/2017 | Shamir et al. | |
| 2017/0256259 A1 | 9/2017 | Froelich | |
| 2018/0012616 A1* | 1/2018 | Salishev | H04R 1/04 |
| 2018/0061399 A1 | 3/2018 | Rose et al. | |
| 2018/0090127 A1 | 3/2018 | Hofer et al. | |
| 2018/0102135 A1* | 4/2018 | Ebenezer | G10L 25/84 |
| 2018/0102136 A1* | 4/2018 | Ebenezer | G10L 15/16 |
| 2018/0192191 A1* | 7/2018 | TerMeulen | H04R 1/406 |
| 2018/0270565 A1* | 9/2018 | Ganeshkumar | G10L 25/84 |
| 2018/0308489 A1 | 10/2018 | Pan et al. | |
| 2018/0330723 A1 | 11/2018 | Acero et al. | |
| 2019/0007540 A1* | 1/2019 | Shaik | H04M 1/6066 |
| 2019/0098399 A1* | 3/2019 | Lashkari | G01S 5/20 |
| 2019/0198016 A1 | 6/2019 | McKenzie et al. | |
| 2019/0251955 A1* | 8/2019 | Degraye | H03G 9/005 |
| 2019/0311720 A1* | 10/2019 | Pasko | G06F 3/167 |
| 2019/0385635 A1* | 12/2019 | Shahen Tov | G10L 25/21 |
| 2020/0213726 A1* | 7/2020 | Dyrholm | H04R 3/005 |
| 2020/0302922 A1* | 9/2020 | Jazi | G10L 25/84 |
| 2021/0014599 A1* | 1/2021 | Apelqvist | G10L 25/78 |
| 2021/0043223 A1* | 2/2021 | Lee | G02B 27/017 |
| 2021/0306751 A1* | 9/2021 | Roach | G10L 25/78 |
| 2022/0208192 A1 | 6/2022 | Aguayo et al. | |
| 2023/0110708 A1* | 4/2023 | Hui | G10L 25/78 455/518 |
| 2024/0312466 A1* | 9/2024 | Reouveni | G10L 17/14 |

FOREIGN PATENT DOCUMENTS

| | | |
|---|---|---|
| WO | 2009009522 | 1/2009 |
| WO | 2016007563 | 1/2016 |

OTHER PUBLICATIONS

Final Office Action dated Sep. 10, 2024 in U.S. Appl. No. 18/206,567.
Office Action dated Aug. 23, 2024 in U.S. Appl. No. 18/375,906.
English language Abstract for CN1579059 published Feb. 9, 2005.
Office Action dated Feb. 12, 2024 in U.S. Appl. No. 18/206,567.
Raux, Antoine. "Flexible turn-taking for spoken dialog systems." Language Technologies Institute, CMU Dec. 12, 2008.
Notice of Allowance dated Feb. 12, 2025 in U.S. Appl. No. 18/375,906.
Notice of Allowance dated Mar. 19, 2025 in U.S. Appl. No. 18/401,770.
Notice of Allowance dated Oct. 28, 2025 in U.S. Appl. No. 18/206,567.
Office Action dated Oct. 16, 2024 in U.S. Appl. No. 18/401,770.
Notice of Allowance dated Nov. 20, 2024 in U.S. Appl. No. 18/375,906.

* cited by examiner

| Timeout Period | |
|---|---|
| geography | 1.1 |
| food | 2.4 |
| weather | 1.0 |
| stocks | 0.8 |

710

720

SEMANTICALLY CONDITIONED VOICE ACTIVITY DETECTION

BACKGROUND

Knowing when a sentence is complete is important in machines (herein "virtual assistants" or the like) with natural language, turn-taking, speech-based, human-machine interfaces. It tells the system when to speak in a conversation, effectively cutting off the user.

Some systems with speech interfaces that attempt to detect the end of a sentence (EOS) based on an amount of time following end of voice activity (EOVA) use too short of a timeout period and, as a result, cut off people who speak slowly or with long pauses between words or clauses of a sentence.

Some systems that attempt to detect an EOS based on an amount of time with EOVA use a long timeout period and, as a result, are slow to respond at the end of sentences. Both problems frustrate users.

SUMMARY

Various embodiments provide methods for determining a timeout period, after which a virtual assistant responds to a request. According to various embodiments, a user's utterance is recognized. The recognized words are then interpreted in accordance with one or more grammars. Grammars can be comprised by a domain. From the interpreting of the recognized words, a timeout period for the first utterance is determined based on the domain of the first utterance. An end of voice activity in the first utterance is detected. Thereafter an instruction is executed following an amount of time after detecting the end of voice activity of the first utterance. The instruction is executed in response to the amount of time exceeding the timeout period. The executed instruction is based at least in part on interpreting the recognized words.

BRIEF DESCRIPTIONS OF THE DRAWINGS

DETAILED DESCRIPTION

Figure 1A:
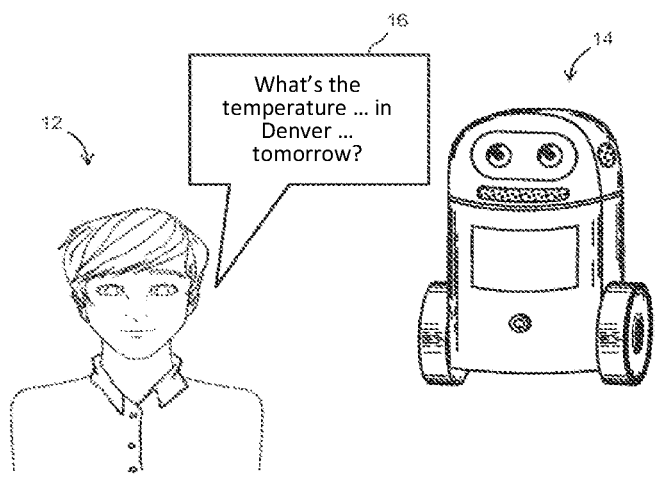
FIG. 1A depicts an interaction with a virtual assistant device according to an embodiment.

In the following disclosure, reference is made to the accompanying drawings, which form a part hereof, and in which are shown by way of illustration specific implementations in which the disclosure may be practiced. Other implementations may be utilized and structural changes may be made without departing from the scope of the present disclosure. References in the specification to "an embodiment," etc., indicate an embodiment that may include a particular feature, structure, or characteristic, but not necessarily does every embodiment include the particular feature, structure, or characteristic. Moreover, such phrases are not necessarily referring to the same embodiment. Further, where a particular feature, structure, or characteristic is described in connection with an embodiment, it is within the knowledge of one skilled in the art to affect such feature, structure, or characteristic in connection with other embodiments without regard to whether explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any non-transitory media that can be accessed by a general purpose or special purpose computer system.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code in the form of computer-executable instructions or data structures and which can be accessed by a general purpose or special purpose computer.

An implementation of the devices, systems, and methods disclosed herein may communicate over a computer network.

Computer-executable instructions comprise instructions that, when executed by a processor, cause a computer or device to perform a certain function. The computer executable instructions may be, for example, binaries, intermediate format instructions such as assembly language, or source code. Although the subject matter is described in language specific to structural features and/or methodological acts, the subject matter defined in the appended claims is not necessarily limited to the described features or acts described herein. Rather, the described features and acts are disclosed as example forms of implementing the claimed inventions.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, and the like. The disclosure may also be practiced in distributed system environments where local and remote computer systems, which are linked (either by wired data links, wireless data links, or by a combination of wired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components.

According to some embodiments, a timeout period after which to execute a natural language command is variable and is based on the user's speech.

A transcription, which can be an input to natural language understanding, may result from automatic speech recognition, keyboard entry, or other means of creating a sequence of words.

Grammar data constructs can have one or more phrasings (groupings of words) that, in response to being matched by a transcription, reveal the intent of the transcription. Grammars may include specific key words, category words (e.g., geographic words), and the like.

Domains refer to groupings of grammars. Domains may be specific to situations in which a virtual assistant is used.

Some embodiments begin interpreting an utterance in response to a wake-up event such as a user saying a key phrase such as "hey Alexa", a user tapping a microphone button, or a user gazing at a camera in a device. Without regard to when interpreting begins, various embodiments determine when to respond based on when a timeout period has occurred following the end of voice activity (EOVA). The timeout period may be determined based on any of several factors or combinations thereof. As will be described in greater detail, in some embodiments, a timeout period is determined based on a domain of the conversation. The domain may be identified as one to which a grammar matching the utterance belongs. In some embodiments, the timeout period is determined by an intent of the utterance. The intent of the utterance may be determined by grammars. In some embodiments, the timeout period is determined by a mode of the interaction. Some embodiments base the timeout period on combinations of the foregoing.

FIG. 1A shows an embodiment of a human-machine interface. A human user 12 speaks to a robot virtual assistant 14, asking, "What's the temperature . . . in Denver . . . tomorrow?", as depicted by a speech bubble 16. As the user utters the phrase, the VA may respond after the word "temperature," understanding "what's the temperature" to be a compete request for information. In this case, the VA could respond with the current temperature of the immediate space, for example. According to embodiments, the VA detects the user pausing after uttering this phrase, i.e., detecting EOVA, and begins counting for a timeout period before responding. Before the end of the timeout period, however, the count is interrupted by the user continuing the information request with "in Denver." In such embodiments, the VA may be prepared to respond with the current temperature in Denver, and begins counting toward a timeout period, which may be the same or a different length timeout period. Again, the user continues the request with "tomorrow," thereby completing this exemplary request. The VA once again detects EOVA and begins counting the timeout period, which may be yet a different timeout period according to embodiments. Eventually, the VA counts through the timeout period and responds to the request.

Figure 1B:
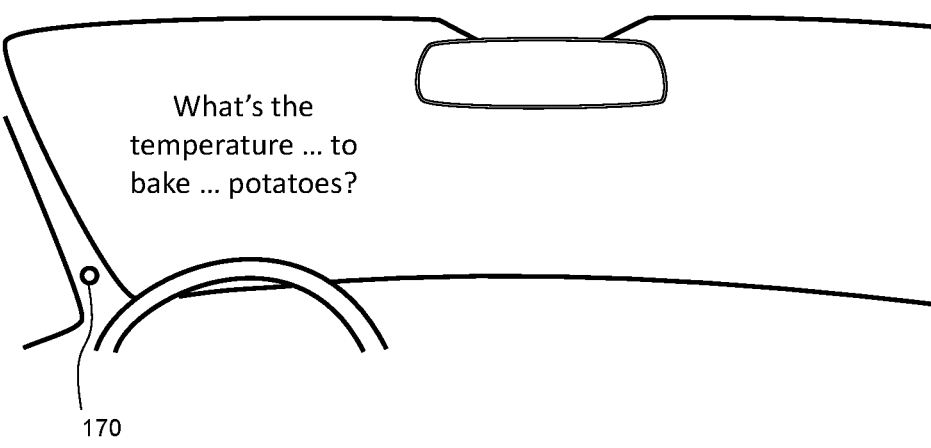
FIG. 1B depicts an interaction with a vehicle-based virtual assistant according to an embodiment.

FIG. 1B shows another embodiment of a human-machine interface. In this embodiment an interaction takes place between a human user (not shown) and a vehicle-based VA, which receives the user's utterance by way of a microphone sensor 170. The user speaks to the VA asking "What's the temperature . . . to bake . . . potatoes?". Here, as with the previous embodiment, the user pauses after the sub-phrase "what's the temperature." The VA detects EOVA and begins counting the timeout period, which, in accordance with embodiments, is based on the content of the phrase, possibly intending to respond with the immediate temperature in the vehicle. But before the count reaches the timeout period, the user continues with "to bake," thereby resetting the count. In this embodiment, the VA may enter an indefinite phase, not being able to interpret the request to determine a meaningful response to "what's the temperature to bake?" The VA may nevertheless detect EOVA and begin counting a toward a timeout period. In this exemplary embodiment, the user interrupts the count by continuing with the request, adding "potatoes." The VA again recognizes EOVA and begins counting toward a timeout period, again based on the content of the request, and, once the count surpasses the timeout period, the VA may respond with the temperature for baking potatoes.

Figure 2:
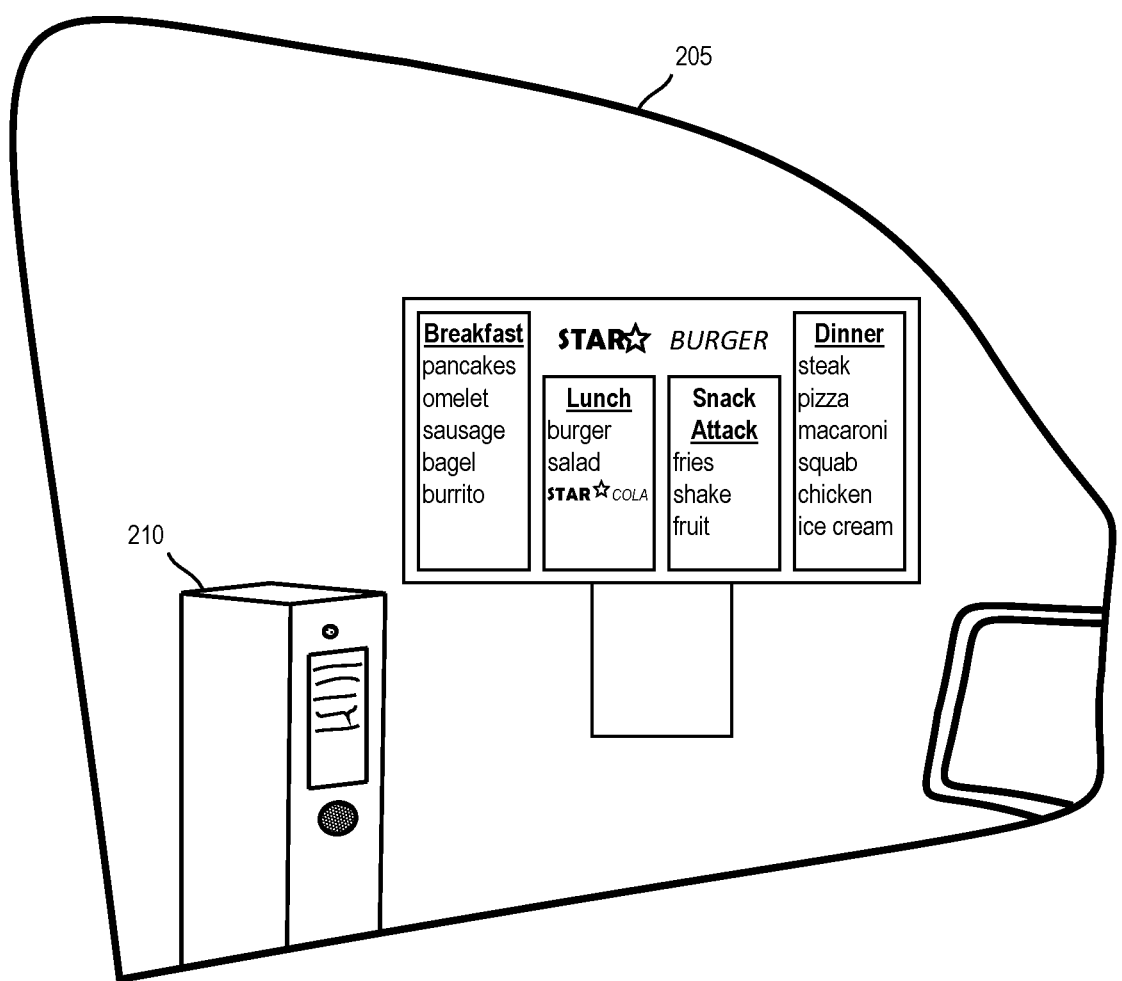
FIG. 2 depicts a food ordering kiosk virtual assistant according to an embodiment.

Directing attention to FIG. 2, yet another exemplary embodiment of a human-machine interface is depicted. This embodiment is specific to a drive-through ordering interaction. In this embodiment a human user (not shown), in a vehicle 205 interacts with a VA ordering kiosk 210. In this specific embodiment, though no specific dialog is shown, similar features as previously described are operative. For instance, as the user utters speech, the content of which comprises an order, the VA identifies EOVA and begins counting toward a timeout period, which, as in other embodiments, is based on one or more factors, as will be described in greater detail below. In this exemplary embodiment, the food ordering domain may be the most relevant factor in determining a timeout period as the interaction progresses toward completion of the user's order.

Figure 3:
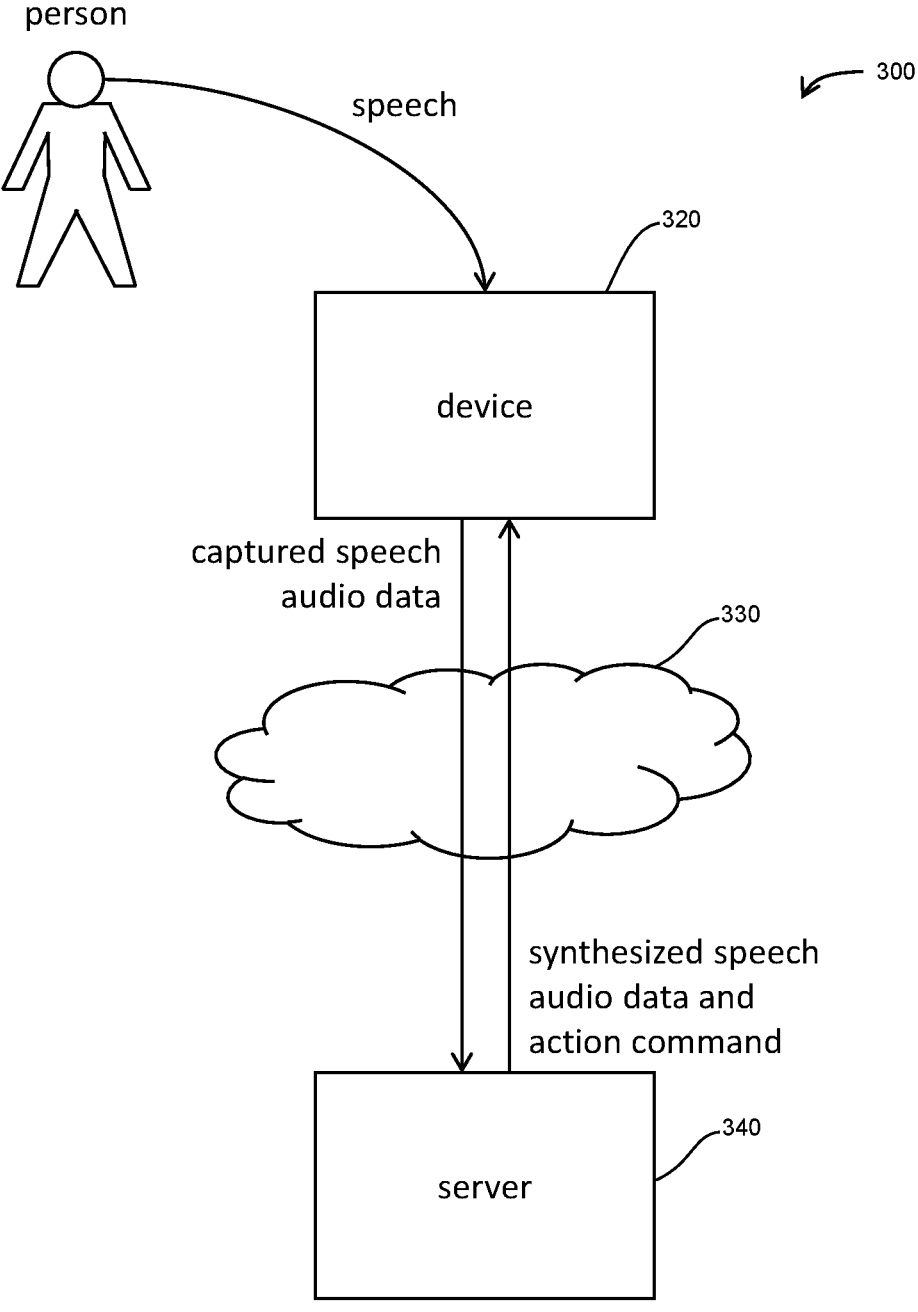
FIG. 3 depicts a block diagram of an interaction with a virtual assistant according to an embodiment.

Directing attention to FIG. 3, a block diagram 300 of an interaction with a voice assistant according to embodiments is depicted. FIG. 3 depicts an embodiment of a virtual assistant device connected to a remote server. In other embodiments wherein a virtual assistant is acting as a standalone device, the functionality depicted in FIG. 3 takes place entirely within the device. In accordance with embodiments depicted in FIG. 3, a person speaks into a device 320. The person's utterance is captured and transmitted through a network 330 to a server 340. The server 340 determines a response to the utterance and returns an action command to the device 320.

Figure 4:
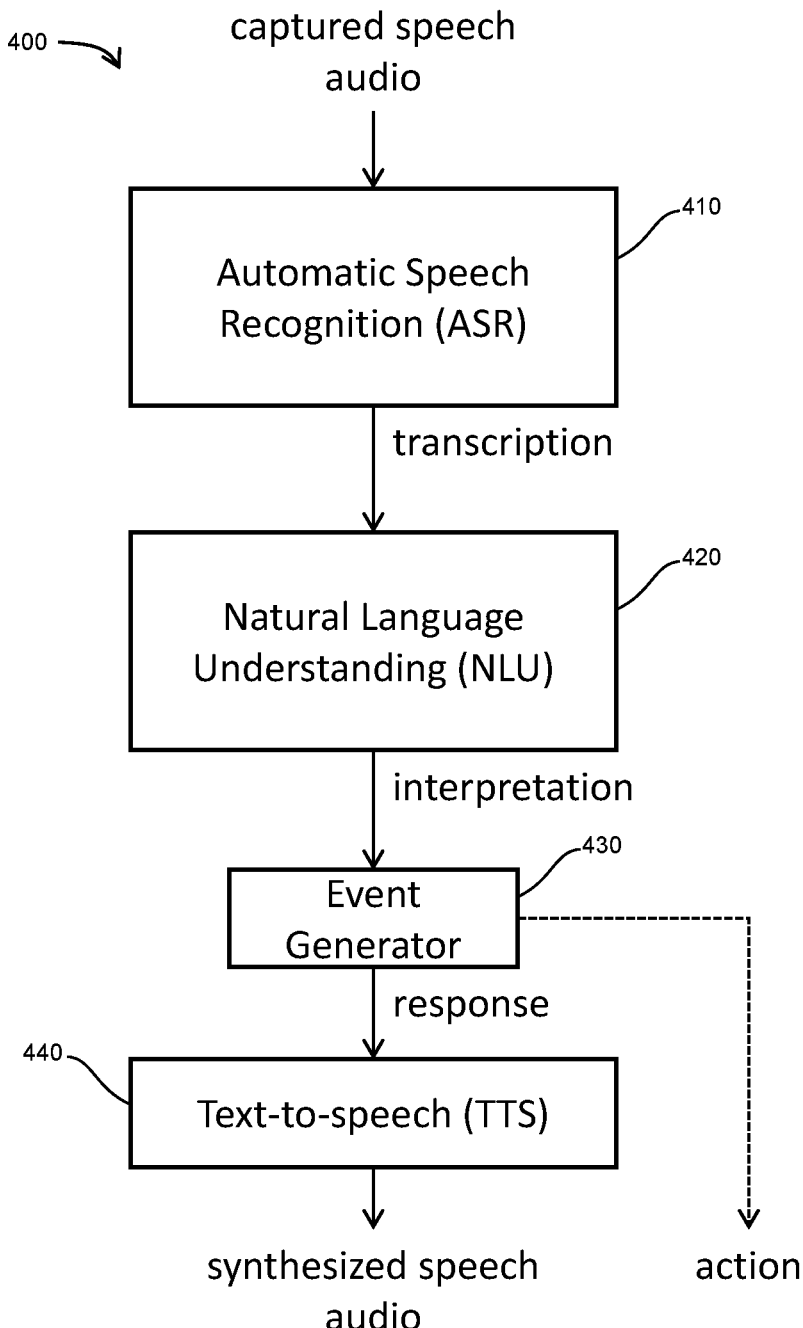
FIG. 4 depicts a flow chart of a process according to an embodiment.

FIG. 4 depicts a block diagram 400 of a typical interaction with a voice assistant according to embodiments. In this exemplary embodiment, the user's captured speech passes through an automatic speech recognition (ASR) process 410. The output of the ASR is a transcription of the utterance (i.e., the captured speech). In some embodiments, since ASR can be prone to transcription errors, the output of ASR can be multiple transcription hypotheses. The transcription is input to a natural language understanding (NLU) process 420. As will be described in greater detail below, the NLU process 420 may include determining an intent, or an interpretation, of the utterance. Also as will be described in greater detail below, the NLU process 420 may include determining a timeout period. In accordance with embodiments, once the VA determines EOVA, a count begins. Once the count exceeds the timeout period, an interpretation is passed to an event generator 430, which results in some action. The event generator 430 may cause an action to take place and/or may generate some other response. As depicted here, the response may result in a text-to-speech process 440 generating synthesized speech audio for a spoken response.

Figure 5:
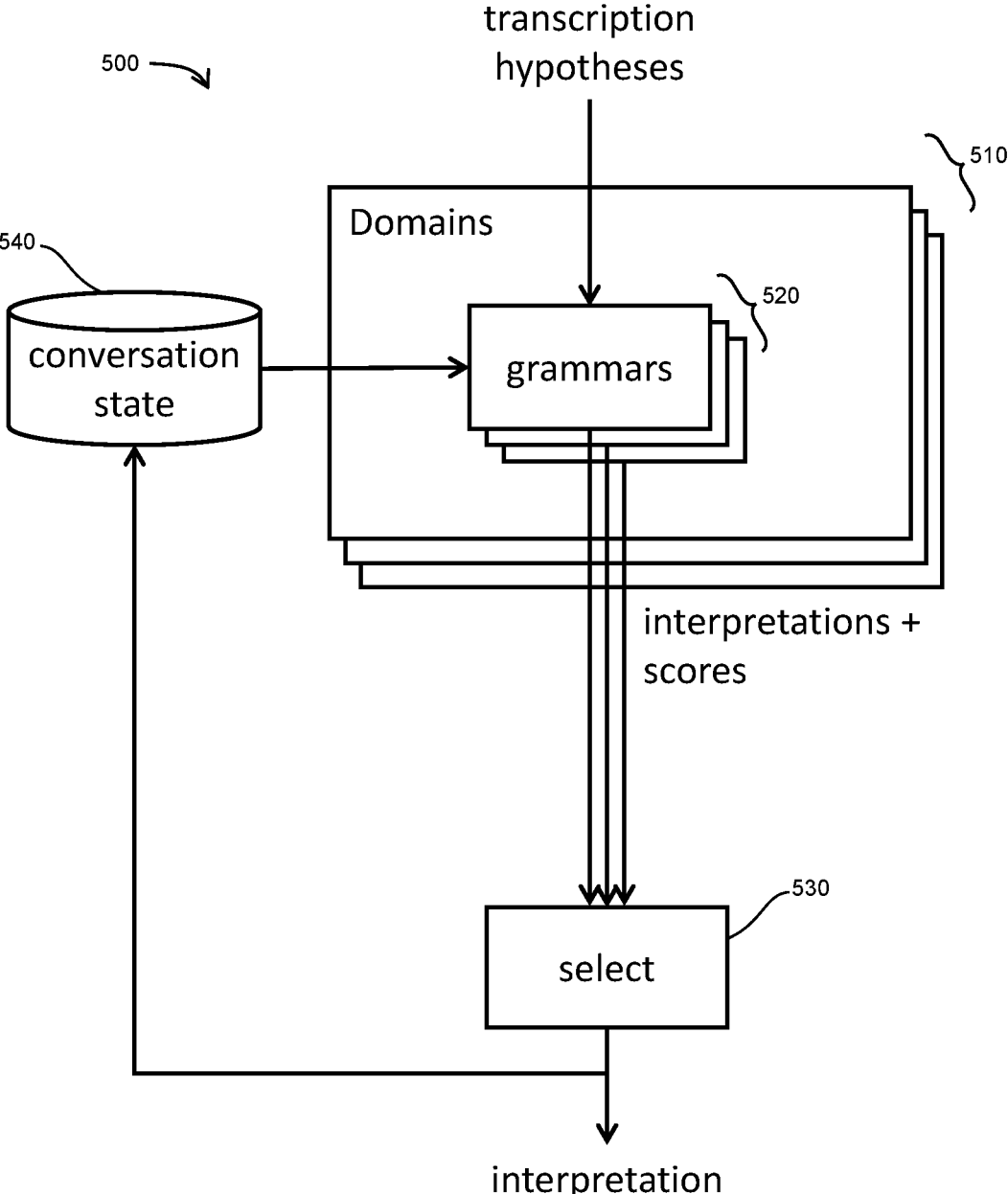
FIG. 5 depicts a block diagram of a virtual assistant system according to an embodiment.

FIG. 5 depicts a more detailed version of the natural language understanding (NLU) process, block 420 of FIG. 4, labeled here as block diagram 500. According to embodiments, blocks 510 comprises domains, or groupings of related grammars 520. Transcription hypotheses (i.e., the output of ASR, block 410 of FIG. 4) are compared to semantic grammars resulting in interpretations and scores. The scores represent probabilities of the semantic meaning of the transcription matching the grammar. At block 530, a selection of an interpretation may be made. The selection may update a conversation state 540 in a feedback loop as additional transcription is received. This enables, for example, the resolution of pronouns to the nouns that they reference from a previous utterance by the user or machine. As will be described below, the selection 530 may be completed only after the timeout period has passed with no further voice activity.

Figure 6:
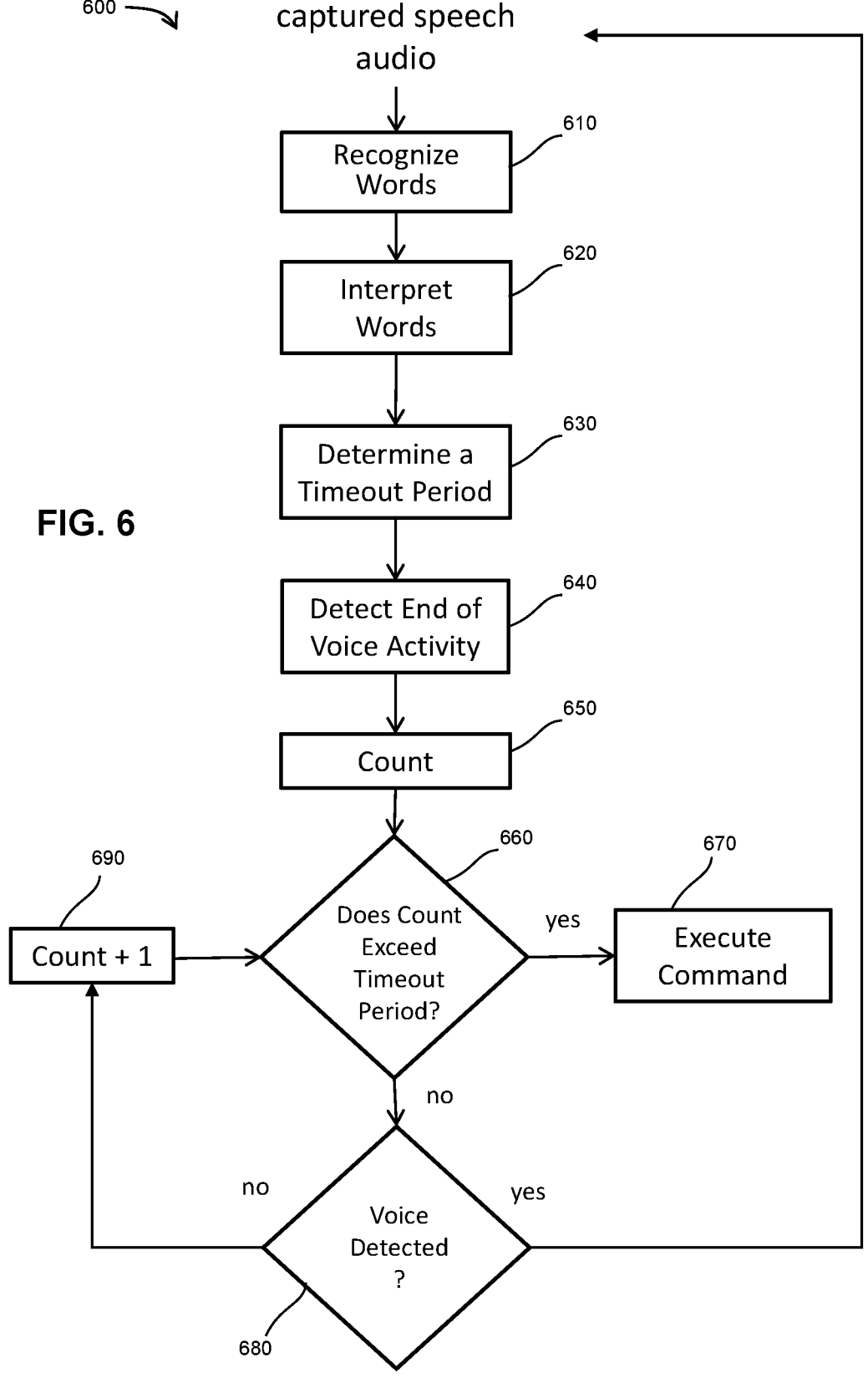
FIG. 6 depicts a flowchart of a process according to an embodiment.

FIG. 6 depicts an exemplary process 600 according to embodiments. FIG. 6 begins with captured words being recognized at block 610. This creates a transcription, which is passed to block 620 for interpretation. Based on the interpreted words, a timeout period may be determined at block 630. Upon detection of end of voice activity at block 640, a count begins at block 650. As the count progresses, a determination is made whether the count exceeds the timeout period at block 660. If yes, a command is executed at block 670. If not, a determination is made whether voice activity has been detected at block 680. If voice is detected, the process returns to the beginning. If not, the count is incremented at block 690. This process continues until the count exceeds the timeout period and a command is executed at block 670.

Notably, FIG. 6 shows an embodiment in which a count is incremented until it reaches a timeout period threshold. In an alternative embodiment, the count begins at the timeout period value and decrements, causing the command to be executed in response to the count reaching zero.

The determination of a timeout period at block 630 may be accomplished in numerous ways according to various embodiments. For instance, in some cases, the timeout period is determined based on the domain of the utterance as determined by the words having been interpreted such that the utterance falls into a particular domain of conversation. In other embodiments, the timeout period is based on an intent of the utterance. Variations and combinations of the foregoing are possible.

Figure 7:
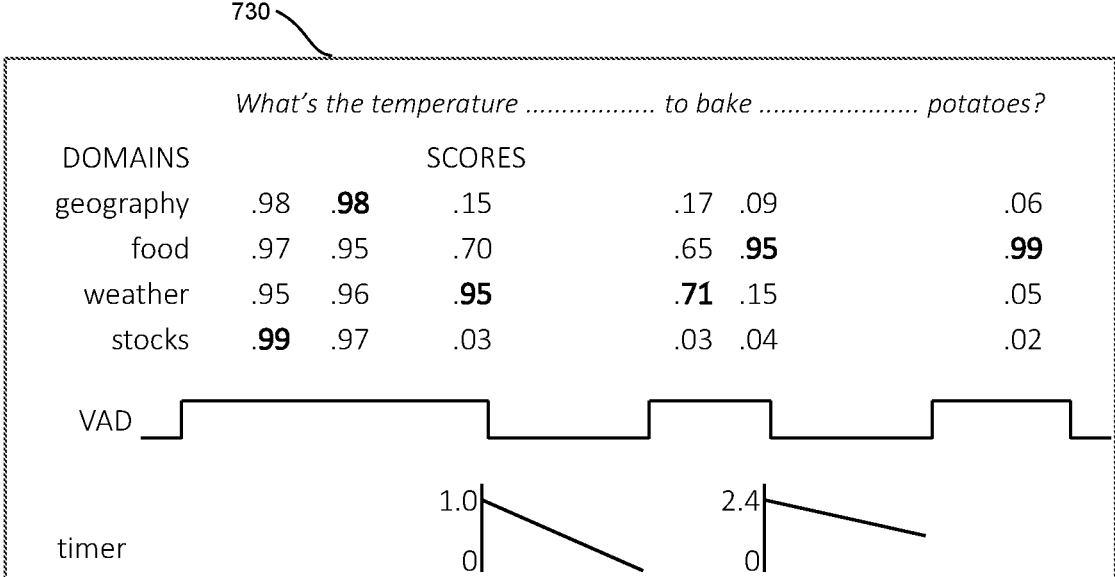
FIG. 7 depicts timing diagrams according to embodiments.
Figure 7:

Attention is directed to FIG. 7 in combination with other figures that have been referred to previously. FIG. 7 includes a block 710 of timeout periods for various domains. The timeout periods maybe expressed in units, which may be, for example, seconds. A system or method of semantically conditioned voice activity detection executes a specific instruction or set of instructions following an amount of time after detecting end of voice activity, the amount of time exceeding the timeout period. The choice of executed instruction can be conditional or executed conditionally based at least in part on interpreting the recognized words.

FIG. 7 includes block 720, which depicts a timeline corresponding to the utterance "What's the temperature . . . in Denver . . . tomorrow?" (see FIG. 1A). The utterance includes multiple pauses represented by the breaks after "temperature" and "Denver." Block 720 also depicts various domains and associated scores, which may be probabilities of the utterance being relevant to the domain. The scores change each time a word is added to the utterance. Block 720 also include a voice activity detection (VAD) indicator that is in a "high" state when voice activity is detected, and a "low" state when no voice activity is detected. Block 720 also depicts timers that countdown a timeout period when no voice activity is detected.

FIG. 7 also depicts block 730, which is similar to block 720 in that it depicts: an utterance, "What's the temperature . . . to bake . . . potatoes?" (see FIG. 1B); various domains and scores that vary as the utterance undergoes ASR and NLU; a VAD indicator; and timeout period countdown timers.

FIG. 7 also depicts a complete sentence indicator 740, which is in a "high" state when an utterance can be interpreted to match the phrasing of at least one grammar and is in a "low" state when the utterance matches no grammar. Indicator 740 illustrates the difference between portions of the utterances depicted in blocks 720 and 730 as they are subjected to ASR and NLU. Notably, the utterance "what's the temperature" is indicated to be complete in both cases. The indicator depicts a difference between the first utterance, which remains a complete sentence with the addition of "Denver," and the second utterance, which cannot be interpreted as a complete sentence with the addition of "bake."

The elements of FIG. 7 will be referenced in the ensuing descriptions of various embodiments.

Timeout Period Based on a Domain

In accordance with various embodiments, a timeout period may vary based on the probabilities of the domain of an utterance among multiple probabilities for various domains. Block 710 depicts a table of timeout periods for various domains. Here, geography, food, weather, and stocks are domains. In some embodiments, the domain in which a virtual assistant operates is predetermined. For example, the interaction depicted in FIG. 1A may be predetermined to take place in the weather domain if the robot virtual assistant 14 is a dedicated weather robot. For sentences interpreted by a grammar in the weather domain, the timeout period is 1.0 unit (e.g., seconds), according to block 710. In other embodiments described below, the domain may be determined based on various factors.

Timeout Period Based on an Intent

In some embodiments, the timeout period may be based on an intent of the utterance. In such embodiments, the utterance undergoes ASR and NLU as in FIG. 4. Grammars may specify timeout periods. For any sequence of words recognized so far, the intent is determined to be the one with the highest score. The timeout period is chosen as the one specified by the grammar with the highest scored intent or a default timeout period if the grammar does not specify one.

Timeout Period Based on Probability of Correctness

In some embodiments, the timeout period is based on a probability of correctness of each of multiple interpretations. Referring to blocks 720 and 730 of FIG. 7, the probability of an utterance corresponding to a particular domain or intent is shown, as the utterance undergoes ASR and NLU. For instance, in block 720, as each word of the phrase "what's the temperature" is interpreted, the probability of the utterance corresponding to a particular domain changes. Beginning with "what's", the domain "stocks" has the highest score. By the time the word "temperature" is interpreted, the scores have changed such that the domain "weather" has the highest probability of correctness of 0.95. Hence, when the VAD indicator detects EOVA, the timer begins counting down from the timeout period associated with "weather," which is 1, as indicated in table 710.

Block 730 depicts a word sequence with the same first three words until the VAD indicator again detects voice activity before the counter reaches the end of the timeout period. Comparing the utterance in block 720 to the utterance in block 730, the utterance "in Denver" results in a different outcome than "to bake." The utterance of block 720 continues to indicate "weather" as most likely domain, while block 730 indicates that the domain "food" becomes the higher probability domain. Thus, upon EOVA detection, the second timer in block 720 again counts down from 1.0, the timeout period associated with weather, while the second timer in block 730 begins to count down from 2.4, the timeout period corresponding to "food."

Timeout Period Based on Weighted Average

In some embodiments the timeout period may vary based on a weighted average of domains or intents. Using block 720 of FIG. 7 as an example, the first timeout period, determined when the VAD goes low, indicating EOVA, rather than the timeout period being 1.0, corresponding to the weather domain, the timeout period may be determined by multiplying the probability of correctness by the domain-specific timeout period for each possible domain. In this example, the variable timeout period would be 0.15×1.1 (the geography domain component) plus 0.70×2.4 (the food domain component) plus 0.95×1.0 (the weather domain component) plus 0.03×0.8 (the stocks domain component) divided by the sum of all the weights (0.15+0.70+0.95+0.03=1.83). Here, the weighted average would be 1.5. Other algorithms for choosing an average, a selection, a maximum or minimum, etc. are possible.

In some embodiments, only weighted averages above a threshold would be included. For instance, in this example, if the probability of correctness were required to be 0.5 or greater, then the geography domain and the stocks domain would be disregarded.

Timeout Period Specified as a Parameter of a Domain

In some embodiments, the timeout period may be specified as a parameter of the domain. As depicted in block 710, each domain can have an associated timeout period. Hence, if the virtual assistant is a single domain VA, then the timeout period will remain fixed accordingly. In other embodiments, the timeout period is specified by the domain of the grammar having the highest probability of a match to the words recognized so far.

In a specific example, referring to FIG. 2, which depicts a drive-through ordering kiosk, the domain is fixed accordingly, in this case food. Hence, at each EOVA detection, the counter would begin counting down from 2.4.

Timeout Period Specified as a Multiple of a General Timeout Period

In some embodiments, the timeout period is a multiple of a general timeout period. For instance, the multiple may be domain specific. Assume, for example, that the timeout periods depicted in block 710 are multiples, and the general timeout period is 0.75 seconds. In such an example, once the domain is determined, the associated timeout period (e.g., 0.8 for stocks) is multiplied by 0.75 seconds (a result of 0.6 for utterances most likely related to stocks).

Timeout Period Based on User Speech Rate

In some embodiments, the timeout period may be based, at least in part, on a user's speech rate. Accordingly, as an utterance undergoes ASR, the word rate of the speaker may determine a factor, which increases the timeout period for slow speakers and increases the timeout period for fast speakers. In some embodiments, the factor may be adjusted by the frequency of EOVA detections that fail to reach the end of the timeout period before the user begins speaking again. Conversely, if the timeout period is repeatedly reached in an ongoing conversation, the timeout period may be shortened accordingly. This lengthening or shortening may be a factor and could be applied in combination with other embodiments for varying the timeout period discussed herein.

One way to measure user speech rate is to count the number of words recognized and the time over which they were recognized. The calculation becomes increasingly accurate as more words are recognized. However, the timing should recognize sentence breaks and discount time when words are not spoken. User speech rate measurements can be made in the short term, which accommodates mood-based changes in speech rate or over the long term, which measures a user's culturally ingrained speech speed. A combination of short and long term measurements can be combined and they can be stored in a user profile to use for future utterances by the same user. Another alternative or complementary way to measure speech rate is to measure the length of time between words. This number will have a higher variance than number of words spoken over a period of time but might be more applicable to counting time between voice activity detections.

Timeout Period Based on Whether Recognized Words could be a Prefix

In some embodiments, the timeout period is based on whether the interpreted utterance could be a prefix to a longer utterance having another interpretation. So even if the interpreted utterance matches a grammar when EOVA is detected, the timeout period may be extended to allow for the possibility that more may be coming. This possibility may be specified by the grammar initially matched. This may be applied in combination with other sources for determining the timeout period.

Timeout Period Based on a Mode

In still other embodiments, the timeout period may be specific to a mode. In such cases, the timeout period may be fixed initially to a default timeout period when in a default mode but would become a mode dependent modal timeout period upon some trigger being activated that places the conversation into a specific modal dialog. The trigger could be user initiated or could be based on an intent or a domain that is determined from the interpreted utterance. Initiation of such a "modal dialog" could, in some embodiments, override any other embodiments for determining a timeout period discussed herein.

The invention claimed is:

1. A method comprising:
   recognizing words within an utterance of a user by a speech recognition engine to generate one or more transcription hypotheses;
   interpreting, by a natural language understanding processor, the recognized words by comparing the transcription hypotheses to a plurality of semantic grammars respectively associated with a plurality of domains, each semantic grammar producing a probability score representing a likelihood that the utterance corresponds to the respective domain;

from the interpreting of the recognized words, determining by the processor, a weighted-average timeout period for the utterance as a weighted average of domain-specific timeout values, each domain-specific timeout value being multiplied by its corresponding probability score and divided by a sum of the probability scores;

detecting an end of voice activity in the first utterance using a voice activity detector coupled to a microphone sensor; and executing, by the processor, an instruction following an amount of time after detecting the end of voice activity, the instruction being executed in response to the amount of time exceeding the determined weighted-average timeout period, and being based at least in part on the interpreted words.

2. The method of claim 1, wherein interpreting includes determining a probability of correctness, the method further comprising interpreting the recognized words according to a second grammar comprised by a second domain, wherein the timeout period is selected based on which of multiple interpretations has the highest probability of correctness.

3. The method of claim 1, wherein interpreting includes determining a probability of correctness, the method further comprising interpreting the recognized words according to a second grammar comprised by a second domain; and computing a weighted average of multiple probabilities of correctness, wherein the timeout period is selected based on the weighted average.

4. The method of claim 1, wherein the timeout period is specified as a parameter of the domain.

5. The method of claim 4, wherein the timeout period is specified as a multiple of a general timeout period.

6. The method of claim 1 further comprising, computing a user speech rate, wherein the timeout period is based at least in part on the user speech rate.

7. The method of claim 1 further comprising, computing whether the recognized words can be a prefix to another interpretation, wherein the timeout period is based at least in part on whether the recognized words can be a prefix to another interpretation.

8. The method of claim 1 further comprising:

entering a modal dialog having a modal timeout period different from a default timeout period, wherein the timeout period is based, at least in part, on the default timeout period while in a default mode, and wherein the timeout period is based, at least in part, on the modal timeout period while in the modal dialog.

\* \* \* \* \*